(12) United States Patent
Sannino et al.

(10) Patent No.: US 6,490,135 B1
(45) Date of Patent: Dec. 3, 2002

(54) DISC DRIVE ASSEMBLY HAVING SIDE RAIL-CHANNELED AIR BEARING FOR RAMP LOAD-UNLOAD APPLICATIONS

(75) Inventors: Anthony P. Sannino, Shakopee, MN (US); Michael D. Mundt, Longmont, CO (US); Zine-Eddine Boutaghou, Vadnais Heights, MN (US); Jason W. Riddering, Prior Lake, MN (US); Mary C. Hipwell, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 4 days.

(21) Appl. No.: 09/644,737

(22) Filed: Aug. 23, 2000

Related U.S. Application Data (63) Continuation-in-part of application No. 09/549,424, filed on Apr. 13, 2000.
(60) Provisional application No. 60/203,149, filed on May 9, 2000, and provisional application No. 60/168,796, filed on Dec. 2, 1999.

(51) Int. Cl.7 .......................... G11B 21/21; G11B 5/012
(52) U.S. Cl. ................... 360/235.8; 360/236.3; 360/97.01
(58) Field of Search .................. 360/235.4–235.8, 360/236.1–236.6, 236.8, 236.9, 237, 97.1

(56) References Cited

U.S. PATENT DOCUMENTS

| | | |
|---|---|---|
| 4,212,044 A | 7/1980 | Plotto |
| 4,218,715 A | 8/1980 | Garnier |
| 4,553,184 A | 11/1985 | Ogishima |
| 4,646,180 A | 2/1987 | Ohtsubo |
| 4,757,402 A | 7/1988 | Mo |
| 4,984,114 A | 1/1991 | Takeuchi et al. |
| 5,086,360 A | 2/1992 | Smith et al. |
| 5,128,822 A | 7/1992 | Chapin et al. |
| 5,200,868 A | 4/1993 | Chapin et al. |
| 5,218,494 A | 6/1993 | Chapin et al. |
| 5,317,465 A | 5/1994 | Chapin et al. |
| 5,343,343 A | 8/1994 | Chapin |
| 5,359,480 A | 10/1994 | Nepela et al. |
| 5,490,026 A | 2/1996 | Dorius et al. |
| 5,513,056 A | 4/1996 | Kawasaki et al. |

(List continued on next page.)

FOREIGN PATENT DOCUMENTS

| | | |
|---|---|---|
| JP | 60-242548 | 12/1985 |
| JP | 1-211383 | 8/1989 |
| JP | 1-245480 | 9/1989 |
| JP | 1-319188 | 12/1989 |
| JP | 3-132981 | 6/1991 |

*Primary Examiner*—Craig A. Renner
(74) *Attorney, Agent, or Firm*—Westman, Champlin & Kelly (57) ABSTRACT

A disc drive assembly includes a housing, a disc, an actuator, a ramp and a slider. The ramp is positioned along an edge of the disc to engage a portion of the actuator when the actuator is in a parked position. The slider is supported over the disc by the actuator and includes first and second elongated rails. Each rail has a leading bearing surface, a trailing bearing surface, and a recessed area extending between the leading and trailing bearing surfaces. First and second convergent channels are recessed within the trailing bearing surfaces of the first and second rails, respectively. Each channel includes a leading channel end open to fluid flow from the respective recessed area, non-divergent channel side walls and a trailing channel end closed to the fluid flow and forward of a localized region of the respective trailing bearing surface.

8 Claims, 9 Drawing Sheets

U.S. PATENT DOCUMENTS

| | | |
|---|---|---|
| 5,550,693 A | 8/1996 | Hendriks et al. |
| 5,636,085 A | 6/1997 | Jones et al. |
| 5,737,151 A | 4/1998 | Bolasna et al. |
| 5,761,004 A | 6/1998 | Peck |
| 5,796,551 A | 8/1998 | Samuelson |
| 5,953,181 A | 9/1999 | Utsunomiya |
| 5,963,396 A | 10/1999 | Burga et al. |
| 5,973,881 A | 10/1999 | Ajiki |
| 6,115,219 A * | 9/2000 | Hall ........................ 360/236.9 |
| 6,188,547 B1 * | 2/2001 | Gui et al. ................ 360/236.5 |

* cited by examiner

DISC DRIVE ASSEMBLY HAVING SIDE RAIL-CHANNELED AIR BEARING FOR RAMP LOAD-UNLOAD APPLICATIONS

CROSS-REFERENCE TO RELATED APPLICATION

This application claims the benefit of U.S. Provisional Application Serial No. 60/203,149, entitled "SIDE RAIL-TRENCHED AIR BEARING FOR RAMP LOAD/UNLOAD APPLICATIONS," filed May 9, 2000, and is a continuation-in-part of U.S. application Ser. No. 09/549,424, entitled DISC HEAD SLIDER HAVING RECESSED, TRENCHED RAILS FOR REDUCED STICTION," filed Apr. 13, 2000.

Cross reference is also made to U.S. Ser. No. 09/398,993, entitled "CONVERGENT CHANNEL, TRENCHED DISC HEAD SLIDER," filed Sep. 17, 1999, and to U.S. Ser. No. 09/548,148 entitled "DISC HEAD SLIDER HAVING RECESSED, TRENCHED RAILS FOR ENHANCED DAMPING," filed on Apr. 13, 2000.

BACKGROUND OF THE INVENTION

The present invention relates to disc drive data storage systems and, more particularly, to a disc drive data storage system having a slider with an increased bearing stiffness for ramp load-unload applications.

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider fly above or in close proximity to the disc surface.

In ramp load-unload applications, the disc drive further includes a ramp positioned at an outer diameter of the disc for engaging the suspension. When the disc drive is powered down, the actuator mechanism moves the head gimbal assembly radially outward until the suspension engages the ramp, causing the slider to lift off of the disc surface. During power-up, the disc is accelerated to its normal operating velocity and then the actuator mechanism moves the head gimbal assembly radially inward such that the suspension disengages the ramp allowing the slider to become loaded on to the disc surface.

Using a ramp to load and unload the head gimbal assembly to and from the disc surface has been regarded as an attractive alternative to "contact start/stop" technology in which the slider lands and takes-off from a dedicated zone on the disc surface. The ramp load-unload technique can be used for solving tribological problems associated with lower fly heights and for meeting severe requirements of non-operational shock performance. However, this technique introduces an array of other challenges, such as possible severe head-media impact during loading and unloading operations.

Under nominal conditions, advanced air bearings (AABs) can be designed to avoid head-media contact during load and unload. Manufacturing of actual parts, however, introduces deviation from nominal conditions, which can result in larger susceptibility of impact during load-unload operations. Among the numerous dimensions and geometrical features to be controlled during manufacturing, pitch static angle (PSA) and roll static angle (RSA) are the most critical parameters for load-unload applications. PSA is the angle formed between the slider and the suspension in a direction parallel to the suspension's axis of symmetry when no air bearing is formed (i.e., in a "static" state). RSA is the angle formed between the slider and the suspension in a direction perpendicular to the suspension's axis of symmetry. Since PSA and RSA have an influence on the pitch and roll attitude of the slider during flight, a non-optimal PSA or RSA results in the slider tilting with respect to the radial motion of the suspension during loading and unloading operations. Under these conditions, it is possible that edges or corners of the slider can become close enough to the media to induce light contact or severe impact. This can cause damage to stored data and can cause permanent physical damage to the media.

A slider is desired, which increases the load-unload robustness by preventing or reducing head-media contact over an acceptable range of manufacturing deviations in RSA and PSA from nominal RSA and PSA values.

SUMMARY OF THE INVENTION

One aspect of the present invention relates to a disc drive assembly, which includes a housing, a disc, an actuator, a ramp and a slider. The disc is rotatable about a central axis within the housing. The actuator is mounted within the housing and has a parked position along an edge of the disc. The ramp is positioned along the edge of the disc to engage a portion of the actuator when the actuator is in the parked position. The slider is supported over the disc by the actuator and includes first and second elongated rails disposed about a first recessed area on the slider. Each of the rails has a rail width measured from an inner rail edge to an outer rail edge, a leading bearing surface, a trailing bearing surface, and a second recessed area extending between the leading and trailing bearing surfaces, which is recessed from the bearing surfaces and raised from the first recessed area, across the rail width. First and second convergent channels are recessed within the trailing bearing surfaces of the first and second rails, respectively. Each channel includes a leading channel end open to fluid flow from the respective second recessed area, non-divergent channel side walls and a trailing channel end closed to the fluid flow and forward of a localized region of the respective trailing bearing surface.

Another aspect of the present invention relates to a disc drive assembly having a disc rotatable about a central axis, a ramp load-unload suspension and a slider supported over the disc by the suspension. The slider has elongated rails with convergent channels and recessed waist areas for generating pressure peaks between the slider and the disc as the disc rotates beneath the slider about the central axis so as to increase roll stiffness of the slider during ramp load and unload operations of the suspension.

DETAILED DESCRIPTION OF ILLUSTRATIVE EMBODIMENTS

Figure 1:
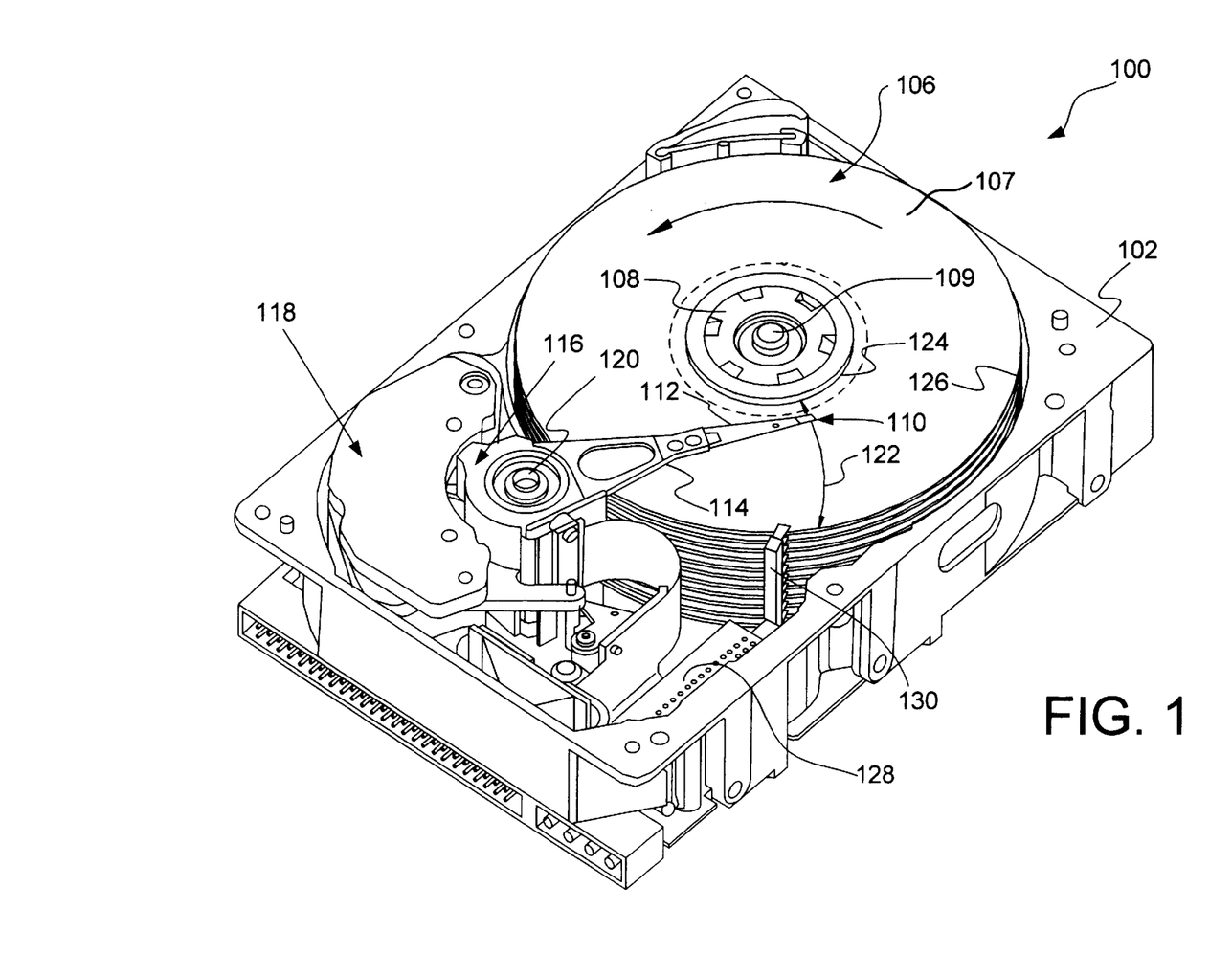
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

Figure 2:
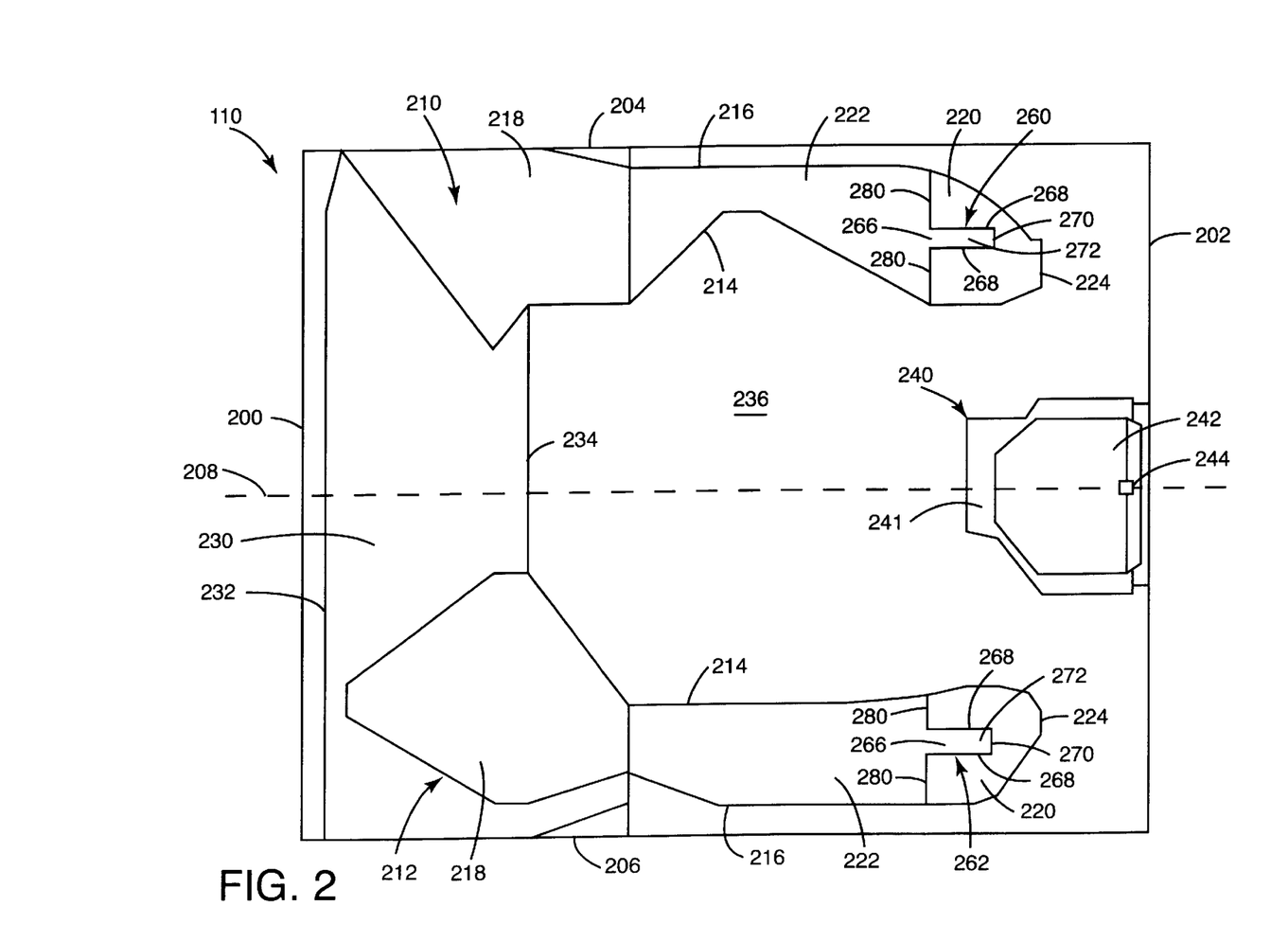
FIG. 2 is a bottom plan view of a slider shown in FIG. 1, as viewed from the surface of a disc, according to one embodiment of the present invention.

As discussed in more detail below, slider 110 has a hydrodynamic (e.g., air) bearing that provides high pitch and roll stiffness, which reduces chance of head-medial contact in ramp load-unload applications. In ramp load-unload applications, disc drive 100 includes a ramp 130 for each suspension 112. Ramps 130 are positioned near disc outer diameter 126. When disc drive 100 is powered-down, voice coil motor 118 rotates actuator 116 toward disc outer diameter 126 so that suspensions 112 engage the respective ramps 130. Ramps 130 lift suspensions 112 so that sliders 110 are unloaded from the disc surface. During power-up, once discs 107 have accelerated to their operating rotation velocity, voice coil motor 118 rotates actuator 116 in a radially inward direction to disengage suspensions 112 from ramps 130 and thereby load sliders 110 onto the disc surfaces. When sliders 110 are loaded onto the disc surfaces, the ramp unloading process introduces a roll motion in the sliders. Depending upon the magnitude of the roll motion, the pitch static angle (PSA) of the suspension, and the roll static angle (RSA) of the suspension, it is possible that the tilt of a typical slider with respect to the radial load-unload motion of actuator 116 can cause the edges or corners of the slider to contact the disc surface. This contact can range from light contact to severe impact and can cause damage to stored data or permanent physical damage to the media. Sliders 110 have a bearing geometry that reduces the chances of such contact FIG. 2 is a bottom plan view of one of the sliders 110 of FIG. 1, as viewed from the surface of disc 107. Slider 110 has a leading edge 200, a trailing edge 202, side edges 204 and 206, and a lateral center line 208. Elongated, raised side rails 210 and 212 are positioned along side edges 204 and 206, respectively. Rails 210 and 212 extend generally from leading slider edge 200 toward trailing slider edge 202 and terminate prior to trailing edge 202. However, rails 210 and 212 can extend all the way to trailing slider edge 202 in alternative embodiments. Each rail 210 and 212 has an inside rail edge 214, an outside rail edge 216, a leading bearing surface 218, a trailing bearing surface 220 and a recessed waist portion 222. Recessed waist portion 722 extends from leading bearing surface 218 to trailing bearing surface 220. In one embodiment, waist portions 222 are generally parallel to and recessed from bearing surfaces 218 and 220 by a step depth of 0.1 to 0.5 um, for example. The recessed waist portions develop substantially ambient pressure during flight. Other depths can also be used in alternative embodiments.

A cavity dam 230 extends between rails 210 and 212, along leading slider edge 200. Cavity dam 230 has a leading edge 232 and a trailing edge 234. Cavity dam 230 and side rails 210 and 212 define a subambient pressure cavity 236, which trails cavity dam 230 relative to a direction of air flow from the leading slider edge 200 toward trailing slider edge 202. In one embodiment, subambient pressure cavity 236 is recessed from leading and trailing bearing surfaces 218 and 220 by 1 to 3 um. Although recessed waist portions 222 are recessed from bearing surfaces 218 and 220, waist portions 222 remain raised from the floor of cavity 236 such that the waist portions 222 continue to define the shape of the cavity 236 and contain subambient pressure within cavity 236.

In one embodiment, cavity dam 230 is generally parallel to and recessed from bearing surfaces 218 and 220 by a step depth of 0.1 to 0.5 um, for example. Other depths can also be used. In addition, cavity dam 230 can be formed with a tapered leading edge in alternative embodiments, if desired.

A raised center pad or rail 240 is positioned along trailing slider edge 202 and is centered along lateral center line 208. In alternative embodiments, center pad 240 can be skewed or offset with respect to line 208. Center pad 240 has a leading step surface 241 and a bearing surface 242. Leading step surface 241 is generally parallel to and recessed from bearing surface 242 by a step depth of 0.1 to 0.5 um, for example, for providing pressurization of bearing surface 242 from air flow venting from cavity 236. Center rail 240 supports a read/write transducer 244 along trailing slider edge 202. In alternative embodiments, transducer 244 can be positioned at other locations on slider 110. However, when placed at or near trailing slider edge 202, transducer 244 is located at the closest point on slider 110 to the surface of disc 107 (shown in FIG. 1) when slider 110 flies with a positive pitch angle. With a positive pitch angle, trailing slider edge 202 is closer to the surface of disc 107 than leading slider edge 200.

Rails 210 and 212 terminate prior to trailing slider edge 202 to allow slider 110 to roll about lateral center line 208 without risking contact between trailing rail edges 224 and the disc surface. Therefore, trailing edge of center pad 240 remains the closest location on slider 110 to the disc surface during flight at relatively large roll angles, thereby improving read and write performance. However, truncating side rails 210 and 212 reduces the amount of positive pressure developed along the rails near trailing slider edge 202, which reduces pitch and roll stiffness.

In order to limit the reduction in pitch and roll stiffness (and to increase these stiffness values further), slider 110 includes convergent channel features 260 and 262, which are recessed within trailing bearing surfaces 220 of side rails 210 and 212 and within bearing surface 242 of center rail 240. These channels can also be referred to as trenches. A similar channel can be formed in bearing surface 242 of center pad 240 in an alternative embodiment. Channels 260 and 262 each have a leading channel end 266, non-divergent side walls 268, a trailing channel end 270 and a channel floor (or "step surface") 272. Channels 260 and 262 also have a side wall 280 to either side of the leading channel ends 266. Channels 260 and 262 are formed through photolithography processes such as ion milling, chemical etching or reactive ion etching (RIE). With these processes, the depth and location of the channels can be accurately controlled. In one embodiment, channel floors 272 of channels 260 and 262 are coplanar and contiguous with recessed waist portions 222 of rails 210 and 212.

In channels 260 and 262, leading channel end 266 is open to fluid flow from recessed areas 222 of the side rails 210 and 212, respectively. However, trailing channel end 270 is closed to the fluid flow. A portion of the fluid flow from recessed areas 222 is directed into channels 260 and 262 and is forced to exit the channels over trailing channels ends 270. This creates localized positive pressure areas on trailing bearing surfaces 220 rearward of trailing channel ends 270. In one embodiment, trailing bearing surfaces 220 have a length measured from trailing channel ends 270 to trailing rail edges 224 that is equal to or greater than the width of channels 260 and 262, as measured between side walls 268. This provides enough of a bearing surface on which the localized positive pressure can act. The localized positive pressure developed on trailing bearing surfaces 220 increases the roll stiffness of slider 110.

During operation, the side walls to either side of leading channel ends 266 present themselves as a substantial pressure rise to the local fluid flow. Since the opening to each channel, at leading channel ends 266, does not have the same pressure rise, it is seen as a preferential path for the fluid flow to travel. Once the fluid flow enters channels 260, 262 and 264, the flow is essentially bounded by channel side walls 268 and trailing channel end 270 and is forced to rise over trailing channel end 270. This creates the localized pressure areas at discrete regions on the rails. Channels 260 and 262 can be symmetrical about lateral center line 208, as shown in FIG. 2, or can be asymmetrical to provide preferential pressurization at certain slider skew angles.

The size and intensity of the localized positive pressure areas depend on the channel length to width ratio, the absolute sizes of the channels and the depth and shape of the channel floors. In one embodiment, the ratio of the channel lengths to the channel widths range from 0.5 to 5.0, but may vary outside that range depending the design purposes of the channel feature. In another embodiment, the length to width ratio ranges from 2.0 to 2.5.

Figure 3:
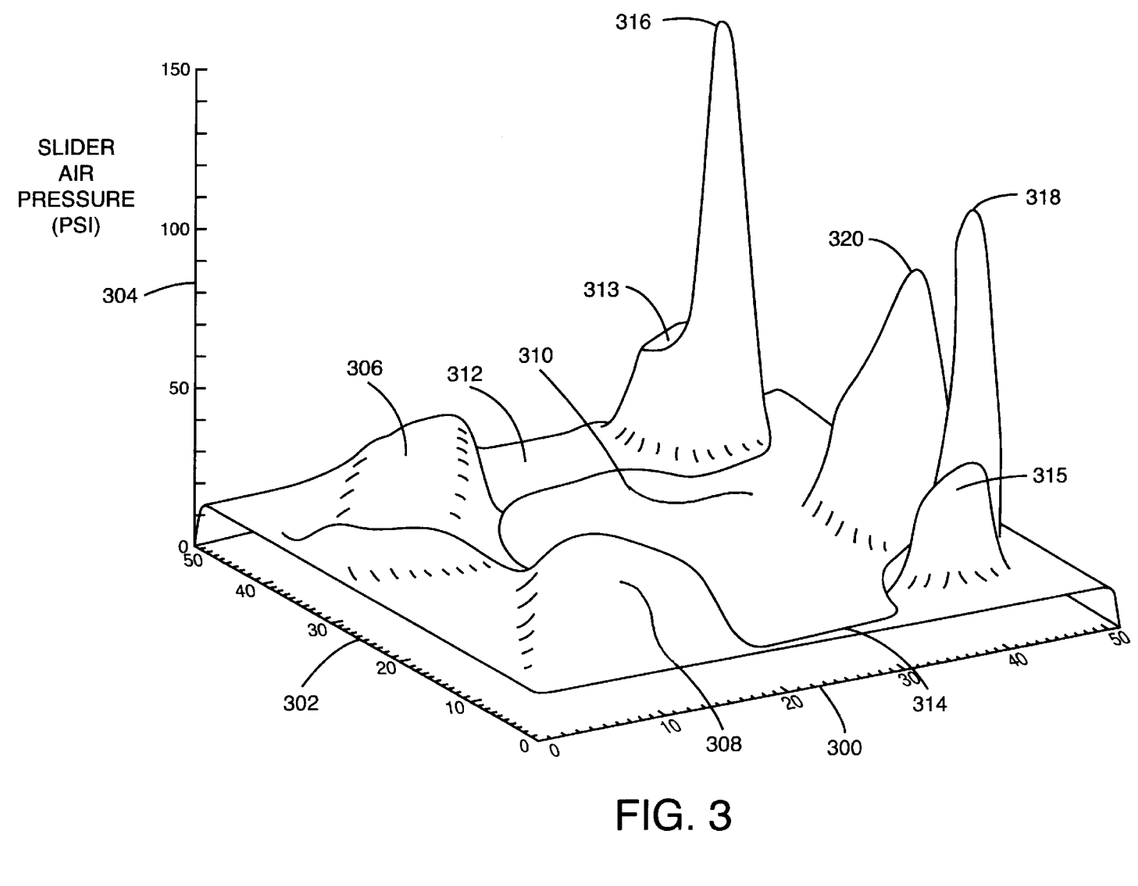
FIG. 3 is a three dimensional diagram illustrating a pressure profile across the bearing surfaces of the slider shown in FIG. 2.

FIG. 3 is a three dimensional diagram illustrating a pressure profile across the bearing surfaces of slider 110 according to one embodiment of the present invention. Axis 300 represents distance along side edges 204 and 206 of slider 110. Axis 302 represents distance along leading slider edge 200. Axis 304 represents pressure amplitude. Leading bearing surfaces 218 of side rails 210 and 212 generate moderate positive pressure areas 306 and 308, respectively, just aft of slider leading edge 200. Subambient pressure cavity 236 generates subambient pressure in area 310. Recessed waist portions 222 of side rails 210 and 212 are at substantially ambient pressure in areas 312 and 314. However, the recessed waist portions 222 still serve to confine subambient pressure within area 310. Trailing bearing surfaces 220 of side rails 210 and 212 generate moderate positive pressure in areas 313 and 315 due to the recess of waist portions 222. However, channels 260 and 262 generate high localized pressure peaks 316 and 318, respectively, which compensate for the pressure loss over waist portions 222 and provide high roll stiffness. In fact, channels 260 and 262 increase roll stiffness to larger levels than conventional negative pressure air bearing (NPAB) sliders having no channel features in the side rails. Center rail 240 generates a pressure peak 320 near trailing slider edge 202, which provides for pitch stiffness.

Figure 5:
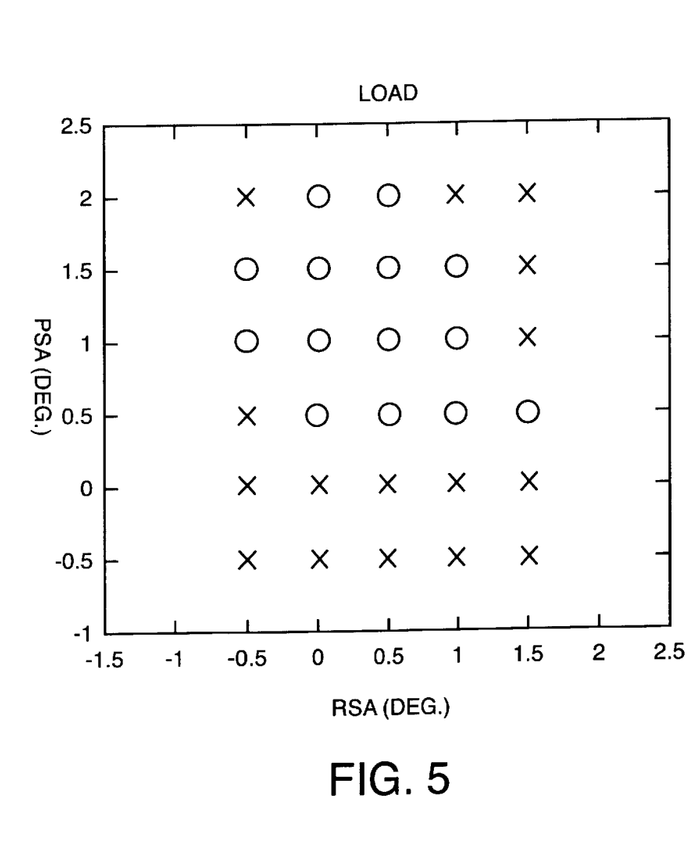
FIGS. 5 and 6 are graphs illustrating non-contact PSA/RSA envelopes for the slider shown in FIG. 4.

The simulated bearing stiffness of slider 110, shown in FIG. 2, was compared with the simulated bearing stiffness of a typical negative pressure air bearing (NPAB) slider 400, shown in FIG. 5, which does not have convergent channel features or recessed waist portions formed in the side rails. Slider 400 has a leading edge 402, a trailing edge 404, side rails 406 and 408, cavity dam 410 and center rail 412.

Table 1 shows the vertical, roll and pitch stiffnesses for slider 400 shown in FIG. 5 at the inner disc diameter, middle disc diameter and outer disc diameter.

TABLE 1

| Stiffness Location | Vertical Stiffness (gm/in) | Roll Stiffness (gm-in/rad) | Pitch Stiffness (gm-in/rad) |
| --- | --- | --- | --- |
| Inner Diameter | 6646 | .649 | 2.378 |
| Med Diameter | 7166 | .518 | 2.931 |
| Outer Diameter | 6324 | .354 | 2.782 |

Table 2 shows the vertical, roll and pitch stiffnesses of slider 110 shown in FIG. 2 at the inner disc diameter, middle disc diameter and outer disc diameter.

TABLE 2

| Stiffness Location | Vertical Stiffness (gm/in) | Roll Stiffness (gm-in/rad) | Pitch Stiffness (gm-in/rad) |
| --- | --- | --- | --- |
| Inner Diameter | 7077 | .797 | 2.673 |
| Med Diameter | 7584 | .785 | 2.981 |
| Outer Diameter | 7552 | .772 | 2.990 |

Comparing Tables 1 and 2, it can be seen that roll stiffness is increased by 23% at the inner disc diameter and 120% at the outer disc diameter when convergent channel features are added to the side rails. Also, vertical stiffness and pitch stiffness of the two sliders remain comparable to one another.

The maximum gain in roll stiffness is observed at the outer diameter where the flow velocity is at its largest level and at which the trench-induced flow confinement produces the highest localized pressure. This gain in roll stiffness is therefore particularly useful for reducing the chances of head-media contact in ramp load-unload applications since the ramp is typically positioned at the outer diameter.

The bearing performance of slider 110 for ramp load-unload applications can be measured against a PSA/RSA "envelope". The PSA and RSA values are important parameters for ramp load-unload applications. The PSA is the angle between the slider and the suspension arm in a direction parallel to the suspension's axis of symmetry when no air bearing is formed (i.e., static). RSA is the angle between the slider and the suspension in a direction perpendicular to the suspension's axis of symmetry. Since PSA and RSA have an influence on pitch and roll fly attitude, non-optimal PSA and/or RSA values result in a slider tilting with respect to the radial motion of the load-unload operation, which can increase the chances of contact between the head and the disc surface.

Figure 4:
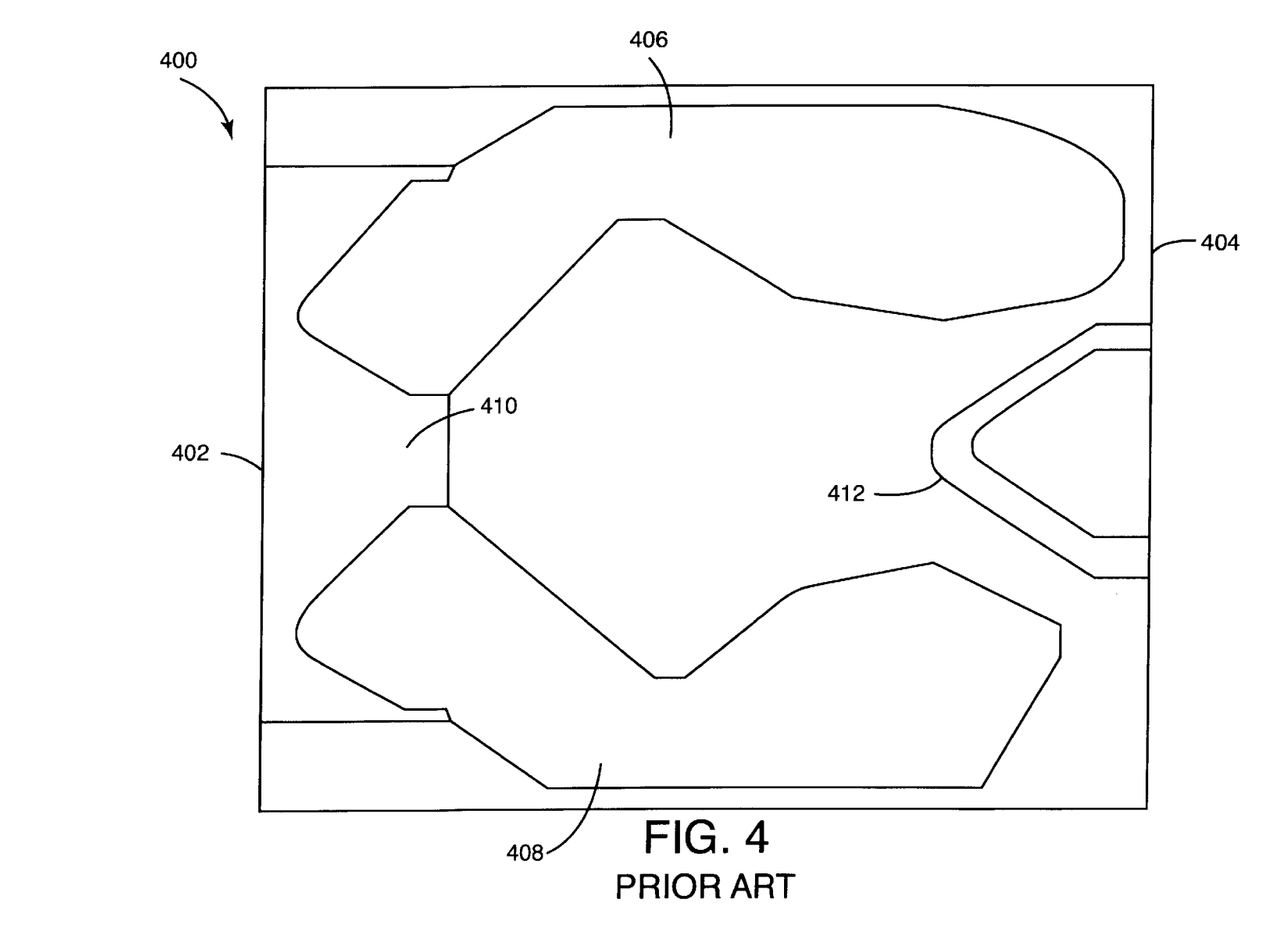
FIG. 4 is a bottom, perspective view of a typical NPAB slider, which does not have convergent channel features or recessed waist portions formed in the side rails.

The PSA/RSA envelopes for the typical NPAB slider 400 (shown in FIG. 4) and slider 110 (shown in FIG. 2) are graphically represented in FIGS. 5–8 by plotting contact conditions against PSA and RSA values ranging from –0.5 to 2 degrees and –0.5 to 1.5 degrees, respectively, during ramp load and unload operations. In each figure, the x-axis represent roll static attitude in degrees and the y-axis represents pitch static attitude in degrees. Individual data points are represented by either a circle, a square or a cross. The circles indicate PSA/RSA combinations resulting in no contact between the slider and disc, where the deflection limiter of the suspension has not engaged during the ramp load or unload operation. Deflection limiters have been used in ramp load-unload applications for limiting deflection of and damage to the flexure portion of the suspension as a negative pressure slider is lifted off the disc surface. The squares indicate PSA/RSA combinations resulting in no contact between the slider and disc, where the deflection limiter of the suspension has engaged during the ramp load or unload operation. Finally, the crosses indicate PSA/RSA combinations resulting in contact between the slider and disc. The non-contact envelope therefore includes all circular or square data points.

Figure 6:
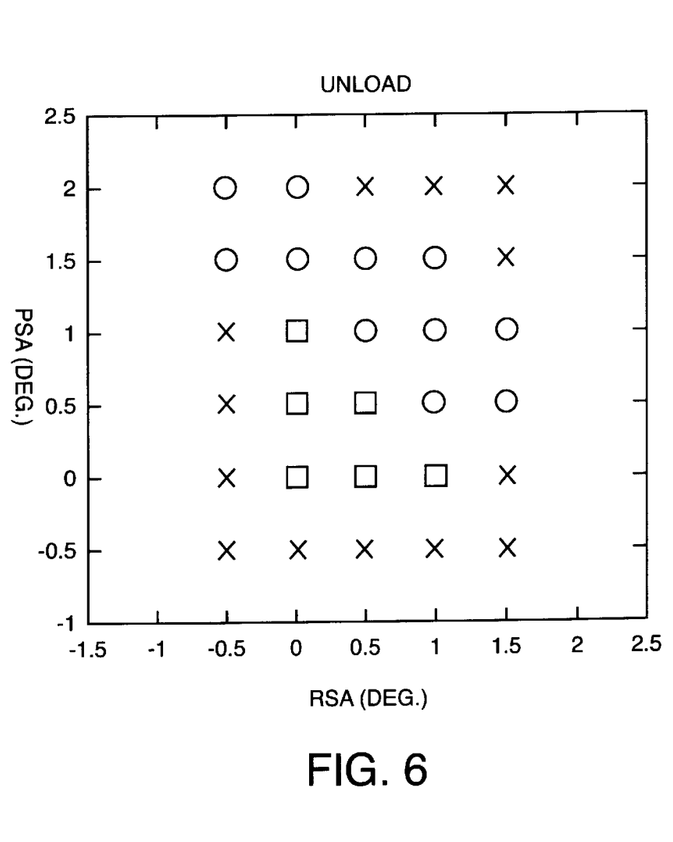

FIGS. 5 and 6 show the PSA/RSA non-contact envelope for slider 400 during load and unload operations, respectively. In FIG. 5, the RSA values contained within the envelope range from –0.5 degrees to 1.5 degrees during a load operation. At an RSA value of –0.5 degrees, there are only two PSA values at which there is no contact. At an RSA value of 1.5 degrees, there is only one PSA value at which there is no contact. There are a total of only 14 non-contact data points in the entire range of PSA/RSA values in FIG. 5. In FIG. 6, the RSA values contained within the envelope also range from –0.5 degrees to 1.5 degrees during an unload operation. At RSA values of –0.5 degrees and 1.5 degrees, there are only two PSA values at which there is no contact. Also, there are a total of only 17 non-contact data points.

Figure 7:
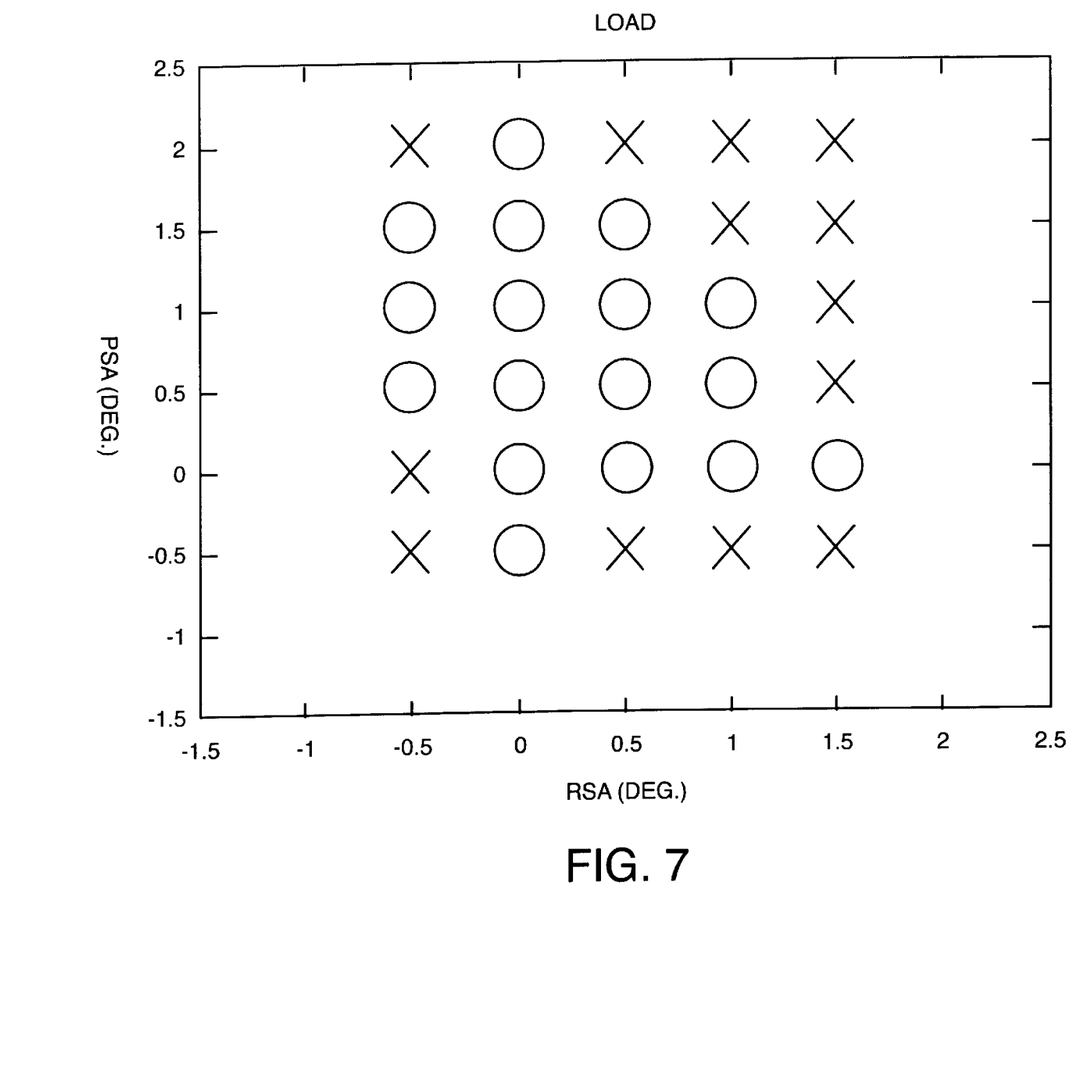
FIGS. 7 and 8 are graphs illustrating non-contact PSA/RSA envelopes for the slider shown in FIG. 2.
Figure 8:
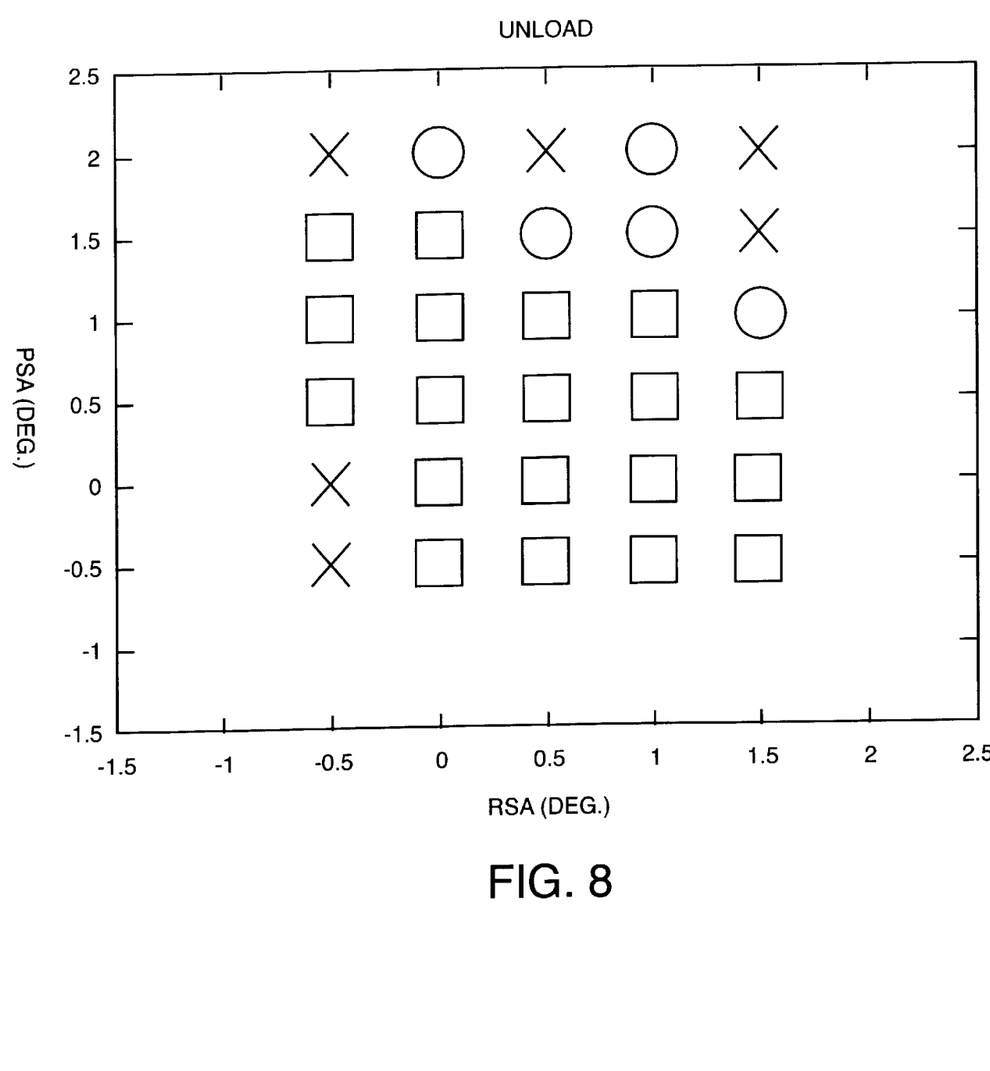

FIGS. 7 and 8 show the PSA/RSA non-contact envelope for slider 110 during load and unload operations, respectively. In FIG. 7, the RSA values contained within the envelope also range from –0.5 degrees to 1.5 degrees during a load operation. However, at an RSA value of –0.5 degrees, there are three PSA values at which there is no contact. At an RSA value of 1.5 degrees, there is one PSA value at which there is no contact. In addition, there are a total of 17 non-contact data points in the entire range of PSA/RSA values in FIG. 7, which exceeds the 14 non-contact data points shown in FIG. 5. In FIG. 8, the RSA values contained within the envelope range from –0.5 degrees to 1.5 degrees during an unload operation. At an RSA value of –0.5 degrees, there are three PSA values at which there is no contact, and at an RSA value of 1.5 degrees, there are four PSA values at which there is no contact. In addition, there are a total of 24 non-contact data points in the entire range of PSA/RSA values in FIG. 7, which exceeds the 17 non-contact data points shown in FIG. 6. The PSA/RSA non-contact envelope for slider 110 is therefore larger than that for slider 400.

Table 3 summarizes the number of non-contact data points occurring in the simulations for slider 110 and slider 400.

TABLE 3

| Air Bearing Styles | Number of Non-Contact Occurrence in Load Operation | Number of Non-contact Occurrence in Unload Operation |
| --- | --- | --- |
| Slider 400 | 14 | 17 |
| Slider 110 | 17 | 24 |

The convergent channels within the side rails therefore increase the load-unload robustness of slider 100 by widening the acceptable RSA range or manufacturing tolerance by increasing roll stiffness. An increased roll stiffness renders the "fly transient" and "fly steady state" roll attitude less sensitive to the roll static attitude (RSA).

Figure 9:
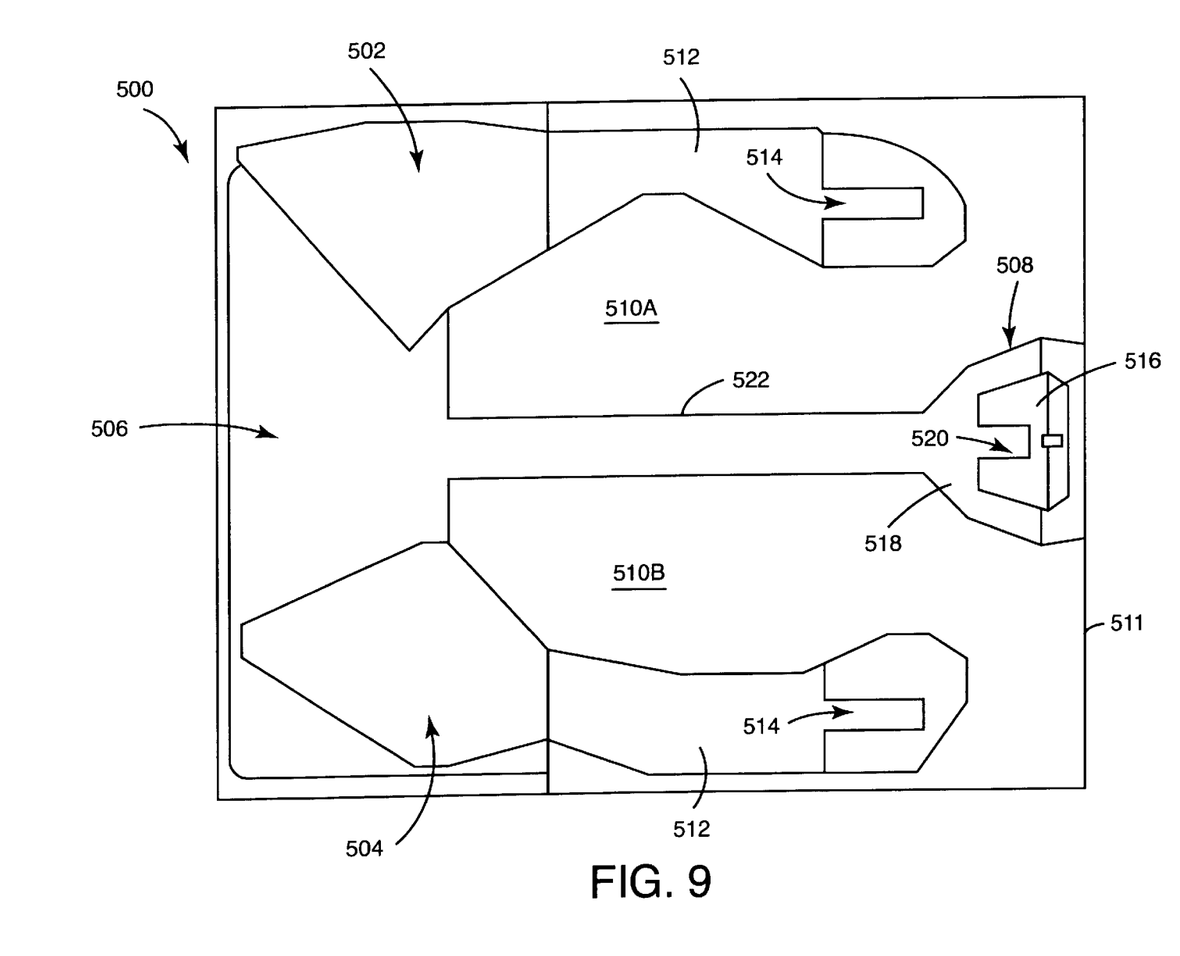
FIG. 9 is a bottom plan view of a slider having an elongated center rail according to an alternative embodiment of the present invention.

FIG. 9 is a bottom plan view of a slider 500 according to another alternative embodiment of the present invention. Slider 500 has side rails 502 and 504, cavity dam 506, center rail 508 and divided cavity portions 510A and 510B. Side rails 502 and 504 and cavity dam 506 are similar to the side rails and cavity dam shown in the embodiment of FIG. 2. Side rails 502 and 504 include recessed waist portions 512 and convergent channel features 514. Center rail 508 is elongated and extends from trailing slider edge 511 to cavity dam 506. Center rail 508 includes raised center rail bearing surface 516, leading step surface 518 and convergent channel feature 520. In the embodiment shown in FIG. 9, leading step surface 518 extends from center pad bearing surface 516 to cavity dam 506. Leading step surface 518 is coplanar and contiguous with cavity dam 506, which is recessed from the bearing surfaces formed by side rails 502 and 504 and center rail 508.

Figure 10:
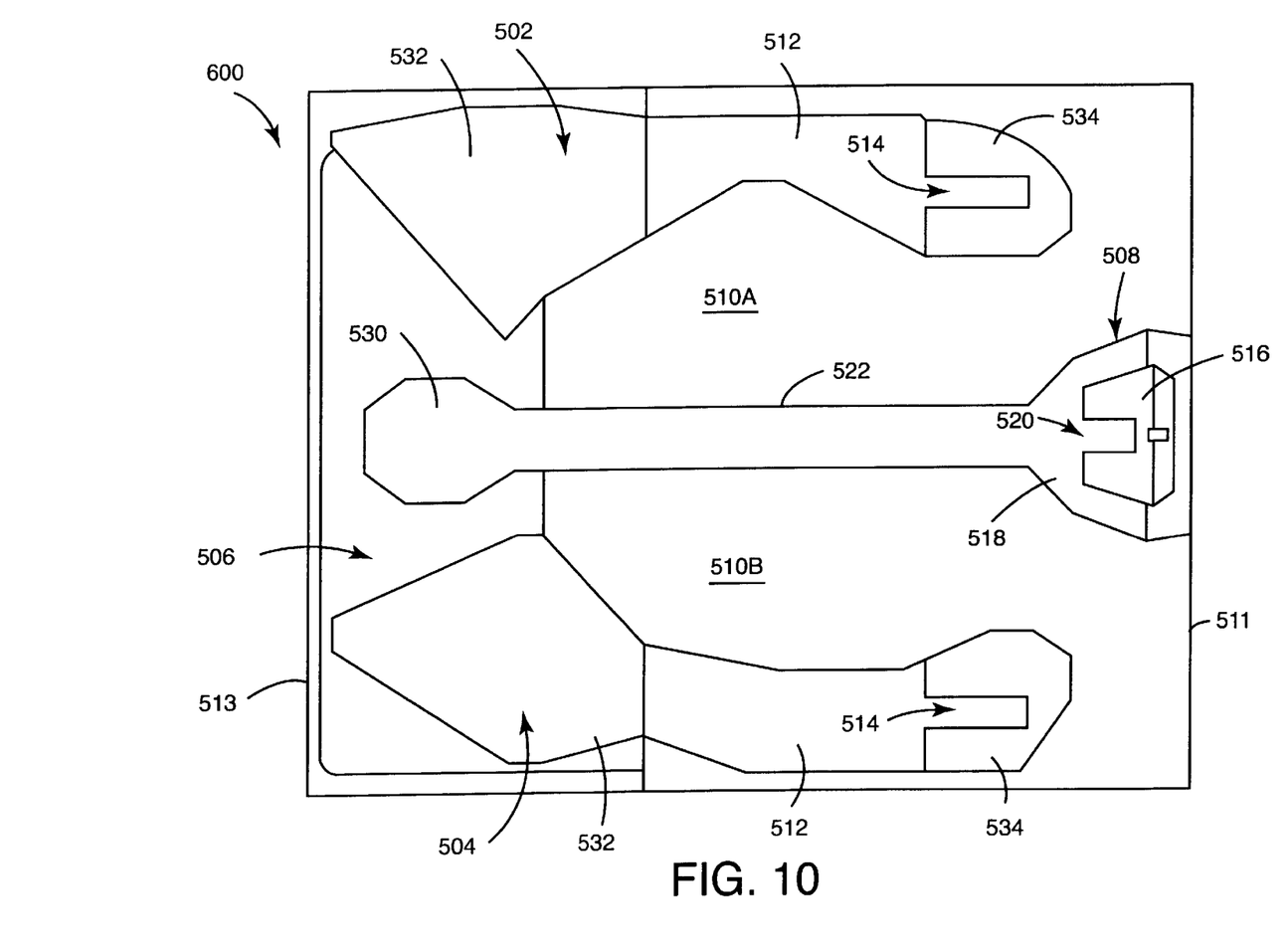
FIG. 10 is a bottom plan view of a slider having an elongated center rail and a raised leading center pad according to another alternative embodiment of the present invention.

FIG. 10 is a bottom plan view of a slider 600 according to another alternative embodiment of the present invention. The same reference numerals are used in FIG. 10 as were used in FIG. 9 for the same or similar elements. Slider 600 is similar to slider 500, shown in FIG. 9, but further includes a leading center rail bearing surface 530, which is formed partially on cavity dam 506 and partially on rectangular section 522. Leading center rail bearing surface 530 is raised from cavity dam 506 and is coplanar with leading and trailing bearing surfaces 532 and 534 of side rails 502 and 504 and with center rail bearing surface 516. Leading center rail bearing surface 530 provides increased pressurization near leading slider edge 513 while still maintaining a recessed step surface 518 for pressurizing convergent channel feature 520. Other alternative geometries can also be used.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the slider example described is a negative pressure slider, it will be appreciated by those skilled in the art that the teachings of the present invention can be applied to other types of sliders, such as positive pressure slider having no cavity dam without departing from the scope and spirit of the present invention. Also, the present invention can be used with any type of ramp load-unload suspension, such as rotary and linear suspensions, and the transducing head can be of any type such as magnetic, magneto-resistive, optical or magneto-optical, for example.

What is claimed is:

1. A disc drive assembly comprising:
    a housing;
    a disc rotatable about a central axis within the housing;
    an actuator mounted within the housing, the actuator having a parked position along an edge of the disc;
    a ramp positioned along the edge of the disc to engage a portion of the actuator when the actuator is in the parked position;
    a slider supported over the disc by the actuator and comprising:
        first and second elongated rails disposed about a first recessed area on the slider, wherein each of the rails comprises a rail width measured from an inner rail edge to an outer rail edge, a leading bearing surface, a trailing bearing surface, and a second recessed area extending between the leading and trailing bearing surfaces, which is recessed from the bearing surfaces and raised from the first recessed area, across the rail width; and
        first and second convergent channels, which are recessed within the trailing bearing surfaces of the first and second rails, respectively, wherein each channel comprises a leading channel end open to fluid flow from the respective second recessed area, non-divergent channel side walls and a trailing channel end closed to the fluid flow and forward of a localized region of the respective trailing bearing surface.

2. The disc drive assembly of claim 1 and further comprising a cavity dam extending between the first and second rails, forward of the first recessed area such that the first recessed area forms a subambient pressure cavity between the first and second elongated rails.

3. The disc drive assembly of claim 1 wherein the first and second convergent channels each comprise a channel floor, which is coplanar and contiguous with the second recessed areas of the first and second rails, respectively.

4. The disc drive assembly of claim 2 wherein the cavity dam, a channel floor and the second recessed areas are recessed from the leading and trailing bearing surfaces by 0.1 to 0.5 microns, and the subambient pressure cavity is recessed from the leading and trailing bearing surfaces by 1 to 3 microns.

5. The disc drive assembly of claim 2 wherein the subambient pressure cavity has a shape that is defined by the cavity dam and the inner edges of the first and second rails, as the inner edges extend along the leading bearing surfaces, the second recessed areas and the trailing bearing surfaces.

6. The disc drive assembly of claim 1 wherein the slider further comprises a leading slider edge, a trailing slider edge and a length measured from the leading slider edge to the trailing slider edge and wherein:
    the non-divergent channel side walls are spaced from one another by a channel width; and
    the localized region of the respective trailing bearing surface has a region length, which is measured along the slider length and is at least as long as the channel width.

7. The disc drive assembly of claim 1 wherein the slider further comprises:
    a leading slider edge;
    a trailing slider edge;
    a center rail positioned between the first and second rails, at the trailing slider edge, wherein the center rail comprises a center bearing surface, a third recessed area which is recessed from the center bearing surface and raised from the first recessed area, and a third convergent channel, which is recessed within the center bearing surface and comprises a leading channel end open to fluid flow from the third recessed area, non-divergent channel side walls and a trailing channel end closed to the fluid flow and forward of a localized region of the center bearing surface; and
    wherein the first and second rails terminate prior to the trailing slider edge.

8. A disc drive assembly comprising:
    a disc rotatable about a central axis;
    a ramp load-unload suspension; and
    slider means supported over the disc by the suspension and having elongated rails with convergent channel and recessed waist area means for generating pressure peaks between the slider means and the disc as the disc rotates beneath the slider means about the central axis so as to increase roll stiffness of the slider means during ramp load and unload operations of the suspension.

* * * * *